(12) United States Patent
Habig et al.

(10) Patent No.: US 10,232,878 B2
(45) Date of Patent: Mar. 19, 2019

(54) TRUE-POWER-ON STEERING ANGLE SENSOR WITH REVOLUTION COUNTER

(71) Applicant: Continental Teves AG & Co. oHG, Frankfurt (DE)

(72) Inventors: Jens Habig, Kronberg (DE); Frank Hickl, Gelnhausen (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 15/369,247

(22) Filed: Dec. 5, 2016

(65) Prior Publication Data

US 2017/0080975 A1    Mar. 23, 2017

Related U.S. Application Data

(63) Continuation of application No. PCT/EP2015/062363, filed on Jun. 3, 2015.

(30) Foreign Application Priority Data

Jun. 3, 2014   (DE) .................. 10 2014 210 518

(51) Int. Cl.
*G01B 7/30* (2006.01)
*B62D 15/02* (2006.01)
*G01D 5/14* (2006.01)

(52) U.S. Cl.
CPC ..... *B62D 15/0215* (2013.01); *B62D 15/0245* (2013.01); *G01D 5/14* (2013.01); *G01D 5/145* (2013.01)

(58) Field of Classification Search
CPC .. B62D 15/0215; B62D 6/10; B62D 15/0245; G01D 5/14
(Continued)

(56) References Cited

U.S. PATENT DOCUMENTS

| 6,552,534 B2 * | 4/2003 | Desbiolles | B62D 15/02 180/400 |
| 6,884,991 B2 * | 4/2005 | Durocher | B62D 15/02 250/231.13 |
| 8,326,490 B2 * | 12/2012 | Burgdorf | G01D 5/2451 701/41 |

FOREIGN PATENT DOCUMENTS

| CN | 1651293 A | 8/2005 |
| DE | 102004023801 | 8/2005 |

(Continued)

OTHER PUBLICATIONS

German Office Action dated Feb. 2, 2015 for corresponding German application No. 10 2014 210 518.8.

(Continued)

*Primary Examiner* — Reena Aurora
(74) *Attorney, Agent, or Firm* — Matthew Binkowski (57) ABSTRACT

The invention relates to a steering angle sensor for detecting a steering angle of a steering column over an angular range of more than 360° in a vehicle, comprising—a transmitter element for exciting a transmitter field and a measuring sensor for exciting an output signal dependent on a reception of the transmitter field, wherein the measuring sensor and the transmitter element are arranged such that the transmitter field received by the measuring sensor is dependent on the steering column rotational angle to be detected, and—a counter element with a non-volatile storage unit for counting and outputting a number of revolutions of the transmitter field with respect to a reference rotational angle.

10 Claims, 6 Drawing Sheets

(58) Field of Classification Search
USPC .................................................. 324/207.25
See application file for complete search history.

(56) References Cited

FOREIGN PATENT DOCUMENTS

| | | |
|---|---|---|
| DE | 102004020149 | 11/2005 |
| DE | 60222356 | 5/2008 |
| DE | 102008051479 | 3/2010 |
| DE | 102008063226 | 7/2010 |
| EP | 1225419 | 7/2002 |
| EP | 1607720 | 12/2005 |

OTHER PUBLICATIONS

International Search Report and Written Opinion dated Aug. 20, 2015 from corresponding International Patent Application No. PCT/EP2015/062363.
Ekbert Hering and Gert Schoenfelder, Sensoren in Wissenschaft und Technik, Feb. 12, 2012, pp. 239-244, Vieweg+Teubner Verlag, Germany, ISBN 978-3-8348-0169-2.
Chinese Office Action dated May 3, 2018 for corresponding Chinese Patent Application No. 201580029614.5.

* cited by examiner

TRUE-POWER-ON STEERING ANGLE SENSOR WITH REVOLUTION COUNTER

CROSS REFERENCE TO RELATED APPLICATION

This application is a continuation of International Application No. PCT/EP2015/062363, filed Jun. 3, 2015, which claims priority to German patent application No. 10 2014 210 518.8, filed Jun. 3, 2014.

TECHNICAL FIELD

The technical field relates to a steering angle sensor for detecting a steering angle.

BACKGROUND

A steering angle sensor is known from the document DE 10 2004 023 801 A1 that can detect a steering angle of a steering column over a range of angles of greater than 360° in a vehicle.

It is an object to improve the known steering angle sensor.

BRIEF SUMMARY

According to one aspect, a steering angle sensor for detecting a steering angle of a steering column over a range of angles greater than 360° in a vehicle comprises a transmitter element for exciting a transmitter field and a measuring sensor for stimulating an output signal depending on the reception of the transmitter field, wherein the measuring sensor and the transmitter element are disposed so that the transmitter field received by the measuring sensor is a function of the detected angle of rotation of the steering column, and a counting element with a non-volatile memory for counting and outputting a number of revolutions of the transmitter element relative to a reference angle of rotation.

The specified steering angle sensor is based on the idea that the steering angle could be used for detecting a driver's intention. This can be used in vehicle components, such as current driver assistance systems, such as, for example, the electronic stability program known as ESP or in steering assistance systems known as EPS, in order to derive therefrom a target value. Just recently, the detection of the steering angle over a plurality of revolutions of the steering column is required for this, even if the steering angle sensors are not supplied with electrical energy over a certain period of time. Such sensors are known as True Power On Sensors.

The steering angle sensor is such a True Power On Sensor and is equipped with a mechanical gearbox for determining an absolute angular position over a plurality of revolutions. The gearbox and the resulting transmission ratio enable a plurality of signals to be generated using sensor elements. In this case the periodicity or the phase position of the individual signals relative to each other, i.e. the relationship thereof to each other, enables the determination of the absolute angular position over a plurality of revolutions of the steering column.

A disadvantage of a prior art steering angle sensor is the large number of components used, since for each signal line a transmitter element known as a measuring element, for example in the form of a magnet and a measuring sensor, as well as a computing unit for determining the absolute position based on the different signal lines, are also necessary.

This is where the specified steering angle sensor implements the proposal of counting the number of revolutions with a counting element. This enables only one signal line to be necessary for determining the absolute angular position. So that the specified steering angle sensor can be used as a True Power On Sensor, the result of the counting element is placed in a non-volatile memory, which can also be read out if the steering angle sensor has not been supplied with electrical energy over a period of time.

In a development of the specified steering angle sensor, the transmitter field is a magnetic field. This enables a suitable magnetic measuring sensor, such as a magnetoresistive measuring sensor based on the AMR effect, the TMR effect or the GMR effect or a magnetic measuring sensor directly detecting the magnetic field, which are inexpensive, accurate and robust, to be used as a measuring sensor.

In an additional development of the specified steering angle sensor, the non-volatile memory comprises at least two magnetizable memory elements that are connected together in series, the magnetization of which can be adjusted by a magnetic source depending on the number of revolutions of the transmitter field. Owing to the series connection of the two magnetizable memory elements, a counting effect can be achieved directly, since the magnetic source cannot magnetize all the magnetizable memory elements connected in series at once, but only sequentially with each full revolution of the steering column. This enables a certain degree of magnetization of the individual magnetizable memory elements that are connected in series to be uniquely associated with a completely defined number of full revolutions of the steering column. During this the full revolutions in both directions of rotation of the steering column are automatically taken into account using a corresponding sign.

In a particular development of the specified steering angle sensor, the memory elements are disposed in a spiral, as a result of which the magnetization that is described above of the individual magnetizable memory elements that are connected in series can be carried out most effectively sequentially.

In an additional development, the specified steering angle sensor comprises a readout device for reading out the magnetization of the memory elements and for outputting the number of revolutions of the transmitter element depending on the magnetization of the memory elements that has been read out. As the individual magnetizable memory elements that are connected in series influence the overall magnetization by boosting it or clearing it, depending on the magnetization direction, a definite number of full revolutions of the steering column can be associated with a certain range of values for the overall magnetization. Therefore, the readout device could be a characteristic curve for example.

Alternatively, the readout device could also read out the magnetization of the individual memory elements separately and thus a digital value for the number of full revolutions of the steering column could be obtained based on the individual magnetizations.

In another development of the specified steering angle sensor, the transmitter element is designed to output a transmitter field in the axial direction of the shaft. This enables the measuring sensor and the counting element to be disposed one above the other looking in the axial direction of the shaft, so that a single transmitter field can be used in order to count the number of full revolutions of the steering column and to detect the angular position of the steering column within a full revolution at the same time.

In yet another development of the specified steering angle sensor, the transmitter element comprises a first semicircular circle segment disk for outputting a first pole of the transmitter field and a second semicircular circle segment disk for outputting a second pole of the transmitter field, the segment section regions of which are disposed facing each other. This enables the counting of the full revolutions of the steering column to be achieved with the lowest number of magnetizations of the aforementioned magnetizable memory elements.

In a preferred development of the specified steering angle sensor, the transmitter element is disposed on a gear wheel that is disposed coaxially to the steering column and that is driven by a peripheral toothing disposed around the steering column. This enables the transmitter element to be positioned axially offset to the steering column in order that the transmitter field can be output in the aforementioned way in the axial direction to the steering column.

In a particularly preferred development, the specified steering angle sensor comprises further toothing disposed peripherally around the steering column, whereby a torsion element is disposed axially between the two toothings. The torsion element is then elastically twisted during a steering process, so that the steering torque applied by the driver can be determined therefrom. This enables the information that can be detected with the specified steering angle sensor to be increased further.

BRIEF DESCRIPTION OF THE DRAWINGS

The properties, features and advantages that are described above, as well as the manner in which the same are achieved, are clearly and fully understandable in combination with the following description of the exemplary embodiments, which are described in detail in combination with the figures, wherein.

In the figures, identical technical elements are provided with identical reference characters and are only described once.

Figure 1:
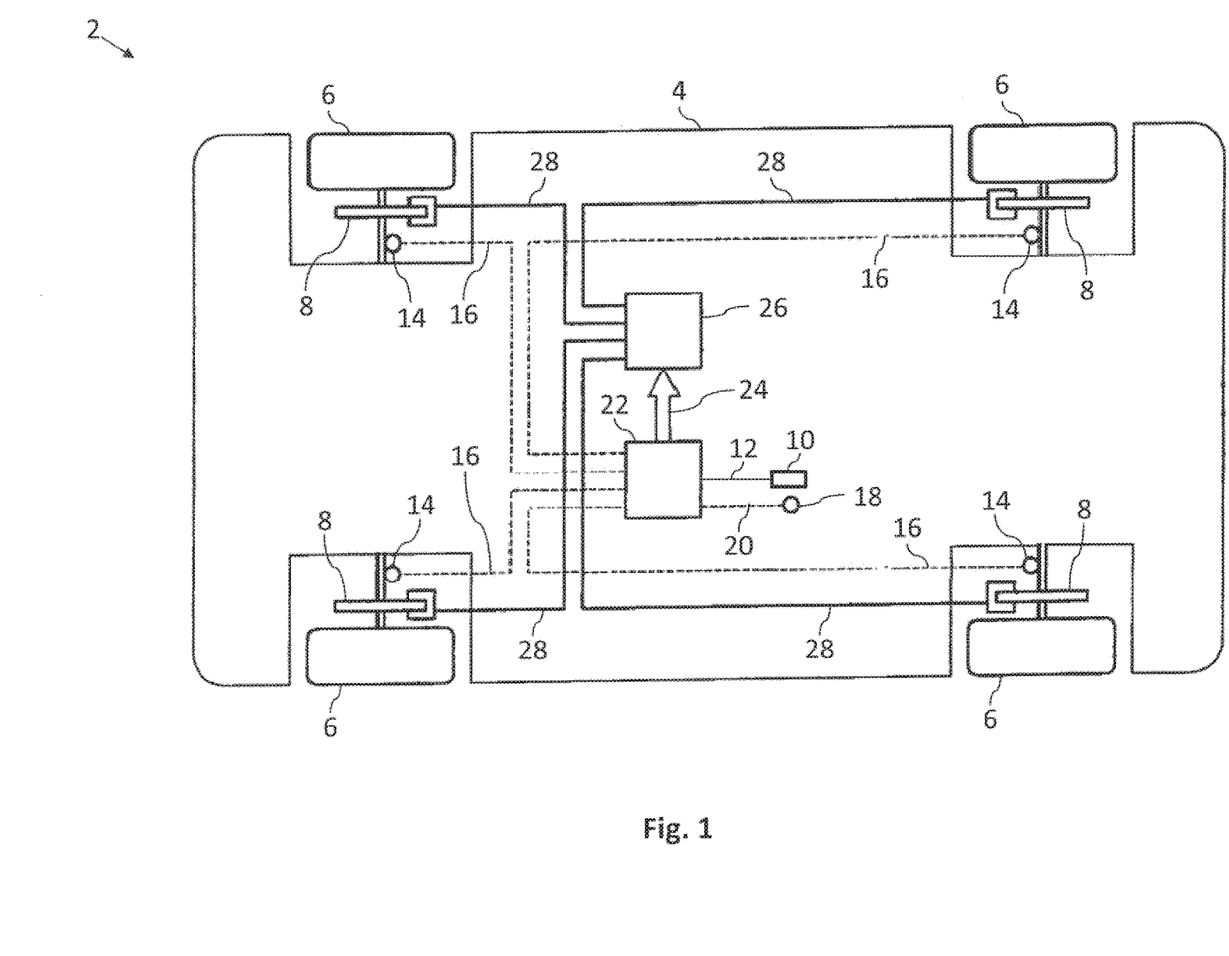
FIG. 1 shows a vehicle with a steering system in a schematic view according to one exemplary embodiment.

Reference is made to FIG. 1, which shows a basic representation of the vehicle 2 with a driving dynamics controller installed in the vehicle. Details of a driving dynamics controller can be obtained from DE 10 2011 080 789 A1 for example.

Each wheel 6 of the vehicle 2 can be decelerated relative to the chassis 4 by means of a brake 8 that is fixedly attached to the chassis 4 in order to slow down the movement of the vehicle 2 on a road that is not shown further.

In doing so, it can happen in a way that is known to the person skilled in the art that the wheels 6 of the vehicle 2 can lose the adhesion thereof to a road that is not shown further and that the vehicle 2 can even be deviated from a trajectory that is predetermined for example by means of a steering wheel that is not shown further by understeer or oversteer. The trajectory can, for example, be predetermined from a steering angle 12 detected by means of a further motion detecting sensor in the form of a steering angle sensor 10. This is prevented by known control circuits such as ABS (anti brake locking system) and ESP (electronic stability program). In such control circuits, measurement data are detected by sensors. Controllers compare the measurement data with target data and control the measurement data to the target data by means of final control elements.

In the present implementation, the vehicle 2 comprises as sensors the revolution rate sensors 14 on the wheels 6 that detect as measurement data the respective revolution rates 16 of the wheels 6. The vehicle 2 further comprises as a sensor the inertial sensor 18, which detects the vehicle dynamic data 20 of the vehicle 2 as measurement data.

Based on the detected revolution rates 16 and vehicle dynamic data 18, a controller 22 can determine in a way known to the person skilled in the art whether the vehicle 2 is skidding on the road or even deviating from the aforementioned predetermined trajectory and can react thereto accordingly with a known controller output signal 24. The controller output signal 24 can then be used by a control device 26 to activate by means of control signals 28 control elements such as the brakes 8, which respond to skidding and deviation from the predetermined trajectory in a known way.

DETAILED DESCRIPTION

Figure 2:
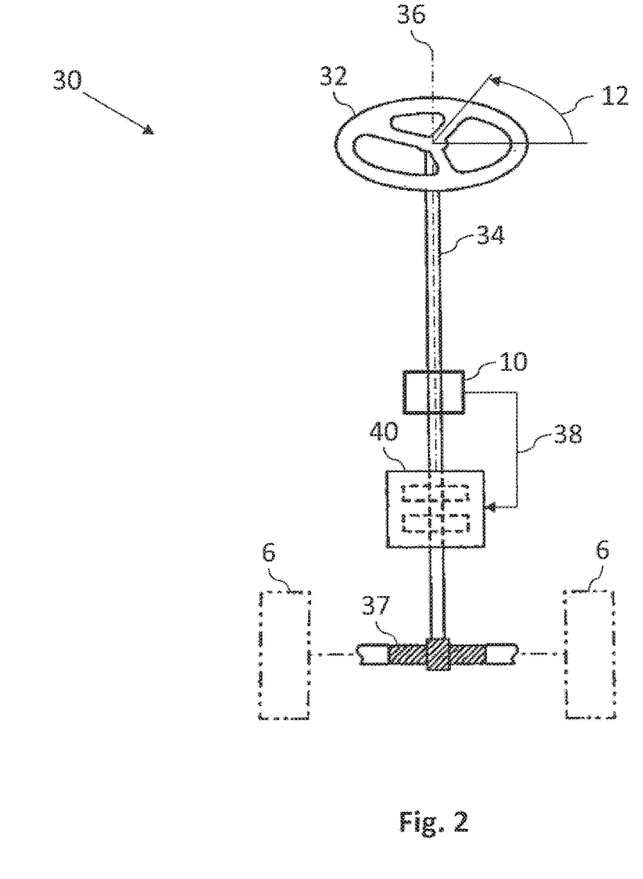
FIG. 2 shows the steering system from FIG. 1 in a schematic view.

We refer to FIG. 2, which shows a steering system 30 for the vehicle of FIG. 1.

The steering system 30 comprises a steering wheel 32 mounted on a steering column 34, which is in turn disposed to be rotatable about a rotation axis 36. Using the steering wheel 32, a driver of the vehicle, which is not shown further, predetermines the steering angle 12 that is to be detected, with which the wheels 6 of the vehicle are to be turned by means of a steering gearbox 37. For this purpose, the driver of the vehicle turns the steering wheel 32 with a torsional force or rotational force 38 until the wheels 6 have reached the desired steering angle 12. The rotational force 38 that is to be applied to turn the steering wheel 32 can however be very tiring for some drivers.

Therefore, within the context of the present implementation the rotational force 38 exerted on the steering column 34 is measured with the steering angle sensor 10 in addition to the angle of rotation 12 and is output to a driving device 40 in the form of a drive motor. The driving device 40 turns the steering column 34 in the same direction as the rotational force 38 and thus keeps the rotational force 38 to be applied by the driver below a defined threshold value, so that the driver can turn the steering wheel 32 with comparatively little effort.

Figure 3:
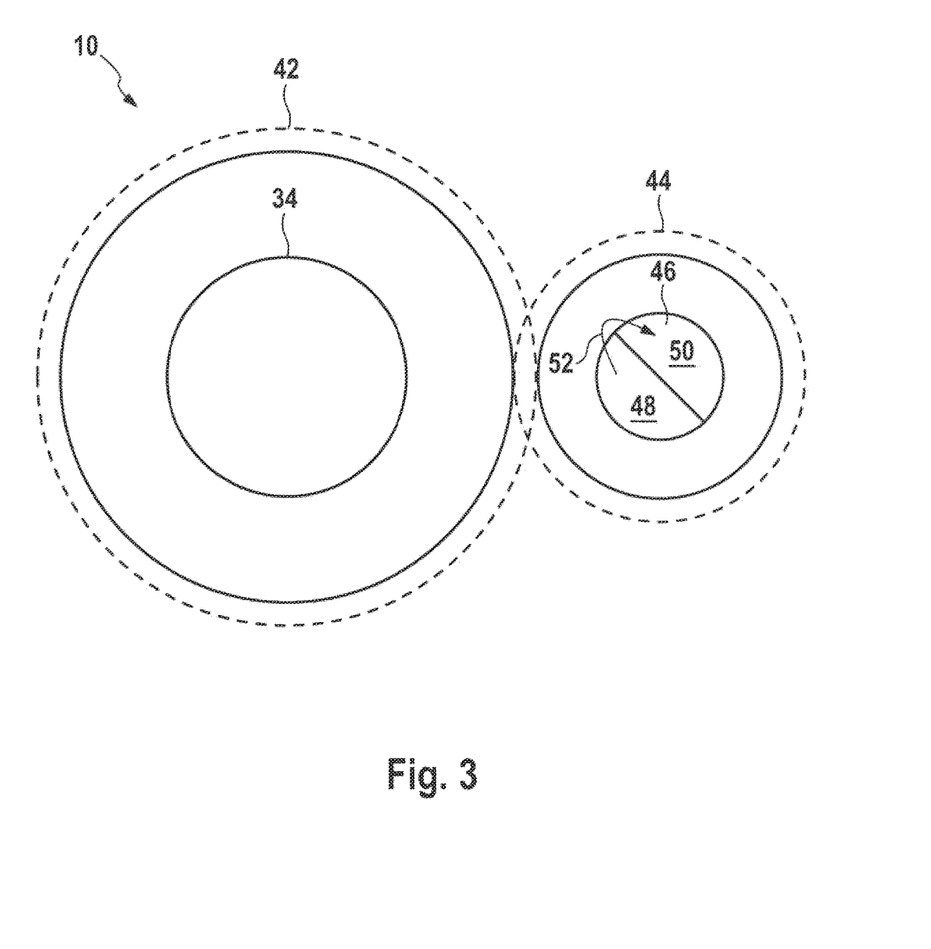
FIG. 3 shows a steering angle sensor in the steering system of FIG. 2 in a schematic top view.
Figure 4:
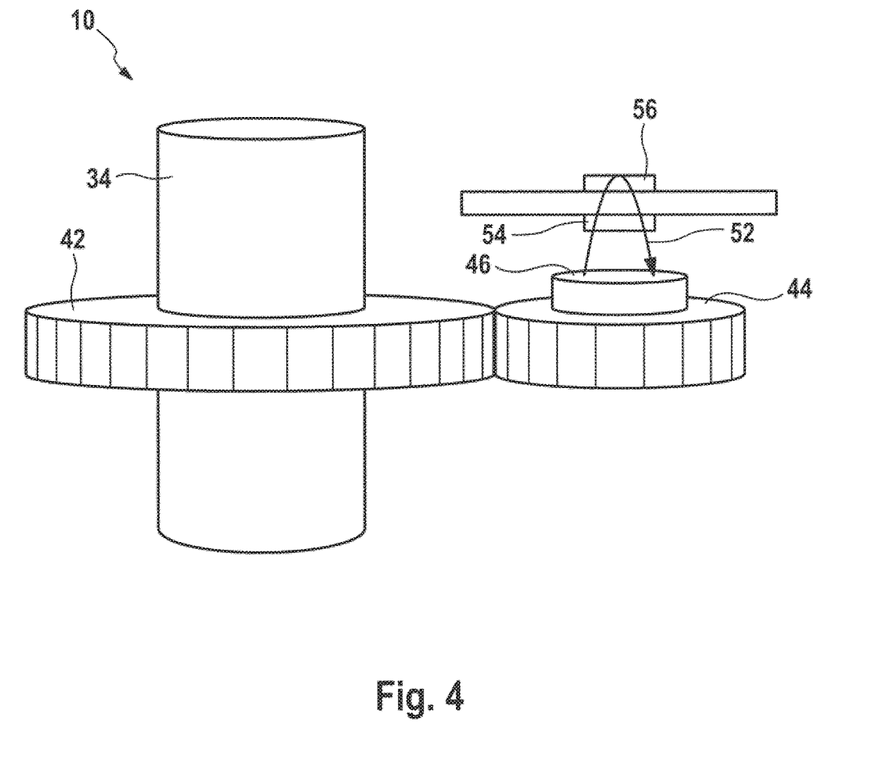
FIG. 4 shows a steering angle sensor in the steering system of FIG. 2 in a perspective view.

We refer to FIG. 3 and FIG. 4, which show the steering angle sensor 10 without a detection capability for the rotational force 38 in a schematic view.

The steering angle sensor 10 comprises a first gear wheel 42 that is rotationally fixedly mounted on the steering column 34 and that is coupled to a second gear wheel 44 by meshing. A transmitter element 46 in the form of an encoder magnet is disposed on the second gear wheel 44, being formed by a semicircular segment-shaped North magnetic pole 48 and a semicircular segment-shaped South magnetic pole 50 that stimulate a magnetic transmitter field 52 in the axial direction of the steering column 34. During the rotation of the steering column 34, the transmitter magnetic field 52 rotates with the column with the steering angle 12 relative to the chassis 4 of the vehicle 2, so that the steering angle 12 can be detected by means of the transmitter magnetic field 52.

The transmitter magnetic field 52 passes through a magnetoresistive measuring sensor 54 that is disposed positionally fixedly relative to the chassis 4 and that is configured to detect the transmitter magnetic field 52 that is rotatable with the steering column 34 relative to the chassis 4. In doing so the strength of the transmitter magnetic field 52 detected by the magnetoresistive measuring sensor 54 depends on the rotational position angle of the transmitter magnetic field 52 relative to the chassis 4 and as a result on the steering angle 12 that is to be detected. Accordingly, a measurement signal that is not shown further and that is a function of the steering angle 12 can be generated with the magnetoresistive measuring sensor 54 and can be output for example to the controller 22 as shown in FIG. 1.

Besides the magnetoresistive measuring sensor 54, the steering angle sensor 10 further comprises a counting element 56. The counting element 56 is intended to detect the number of revolutions of the steering column 34 and is illustrated in detail below using FIG. 5.

Figure 5:
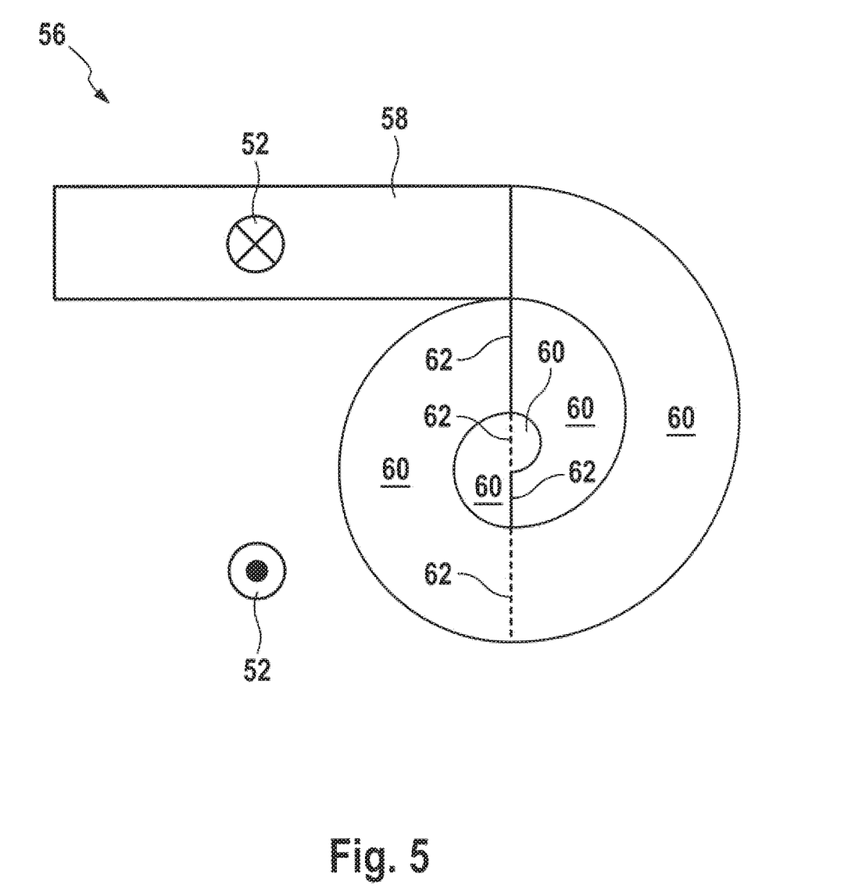
FIG. 5 shows a measuring sensor in the steering angle sensor of FIGS. 3 and 4 in a schematic top view.

The counting element 56 comprises a domain generator 58, through which the magnetic transmitter field 52 passes. A series circuit of magnetizable memory elements 60 is connected to the domain generator 58. The magnetizable memory elements 60 are made of a magnetizable material that is divided without an external magnetic field into Weiss regions separated by means of Bloch walls, the magnetic fields of which cancel each other out in total. The domain wall generator 58 applies an external magnetic field based on the transmitter magnetic field 52 to the magnetizable memory elements 60, which aligns the individual Weiss regions of the magnetizable memory elements 60 bounding on the domain generator 58 up to a domain wall 62 at the end of the magnetizable memory element 60 in a preferred direction dependent on the transmitter magnetic field 52. If the transmitter magnetic field 52 rotates by 180°, then a further domain wall 62 is generated at the end of the adjacent next magnetizable memory element 62, during which the Weiss regions in the magnetizable memory element 62 are also aligned. The process repeats with each rotation of the transmitter magnetic field 52 by 180°, whereby the entire counting element 56 acts as a shift register. If, however the direction of the transmitter magnetic field 52 changes, then initially the domain walls 62 are again sequentially disrupted in a descending sequence and thereby the shift register is cleared until, once all domain walls 62 have been cleared, new domain walls can be built up.

Thus in order to determine the number of revolutions of the steering column 34, the overall magnetization of the individual magnetizable memory elements 62 only needs to be read out. This can be carried out in any arbitrary manner, such as for example by determining the total magnetic resistance of the series circuit of the magnetizable memory elements 60.

If the number of revolutions of the steering column 34 is determined in the previously described manner, the steering angle 12 together with the aforementioned measurement signal that is dependent on the steering angle 12 can be indicated in a range of more than 360°.

Figure 6:
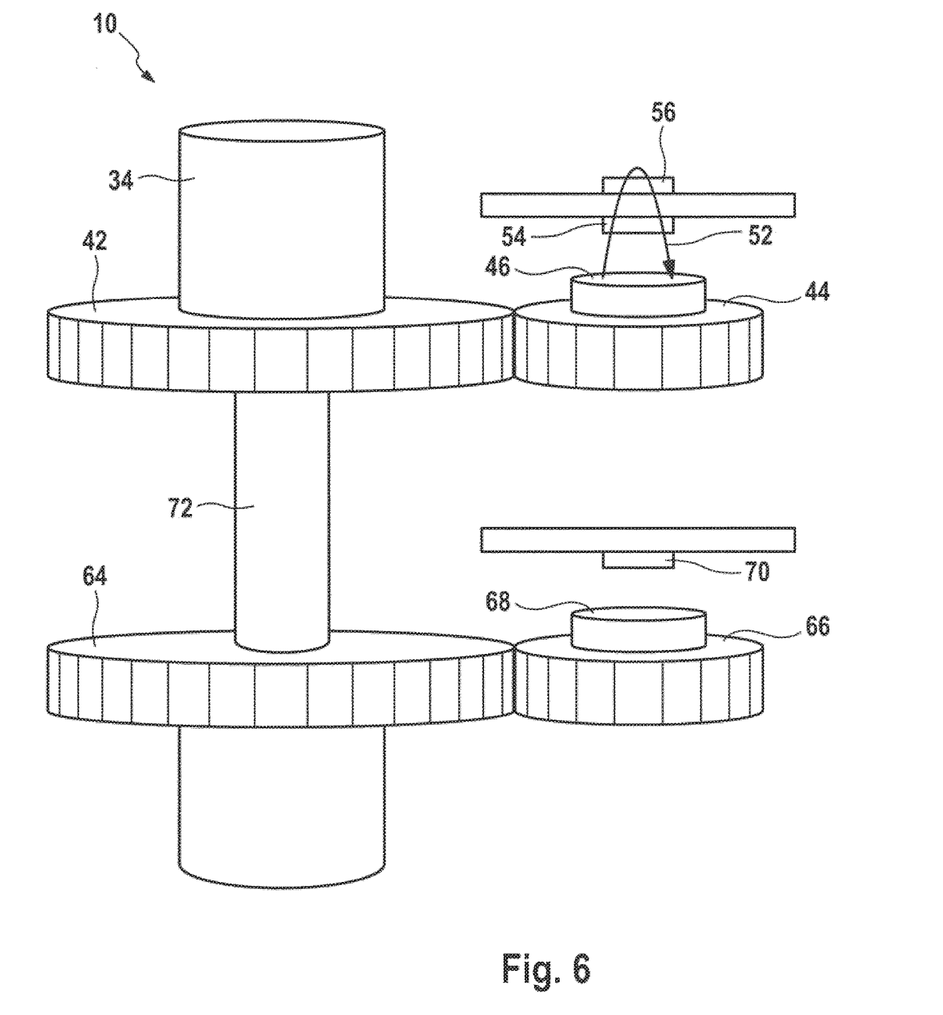
FIG. 6 shows a steering angle sensor of another exemplary embodiment in a perspective view.

The steering angle sensor 10 can, as shown in FIG. 6, be extended by a further first gear wheel 64 that is axially spaced apart from the first gear wheel 42 and that meshes with a further second gear wheel 66 that is axially spaced apart from the second gear wheel 44, so that the further second gear wheel 66 is rotated during the rotation of the steering column 34. A further transmitter element 68 that is constructed similarly to the transmitter element 46 is mounted on the further second gear wheel 66, the further transmitter field of which, which is not shown, is detected by a further measuring sensor 70. This enables the steering angle 12 of the steering column 34 to be detected at two different axially spaced positions of the steering column 34. Between the two axially spaced positions, a torsion element 72 is disposed that is torsioned during rotation of the steering column 34. Owing to the torsion element 72, there is an angle difference between the two axially spaced positions that is dependent on the steering force of the driver for rotation of the steering column 34, so that the steering force can be determined based on the angle difference and the torsional properties of the steering column 34.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A steering angle sensor for detecting a steering angle of a steering column over a range of angles greater than 360° in a vehicle, comprising:
    a transmitter element for stimulating a transmitter field and a measuring sensor for stimulating an output signal depending on reception of the transmitter field, wherein the measuring sensor and the transmitter element are disposed so that the transmitter field received by the measuring sensor is dependent on the angle of rotation of the steering column that is to be detected, and
    a counting element with a non-volatile memory for counting and outputting a number of revolutions of the transmitter field relative to a reference angle of rotation,
    wherein the transmitter field is a magnetic field, and
    wherein the non-volatile memory comprises at least two magnetizable memory elements that are connected together in series, the magnetization of which can be adjusted by a magnetic source depending on the number of revolutions of the transmitter field.

2. The steering angle sensor as set forth in claim 1, wherein the memory elements are disposed in a spiral manner.

3. The steering angle sensor as set forth in claim 1, comprising a readout device for reading out the magnetization of the memory elements and for outputting the number of revolutions of the transmitter element depending on the magnetization of the memory elements that has been read out.

4. The steering angle sensor as set forth in any claim 1, wherein the transmitter element is configured to output the transmitter field in the axial direction of the column.

5. The steering angle sensor as set forth in claim 1, wherein the measuring sensor and the counting element are disposed one above the other when viewed in the axial direction.

6. The steering angle sensor as set forth in claim 1, wherein the transmitter element comprises a first semicircular circle segment disk for stimulating a first pole of the transmitter field and a second semicircular circle segment disk for stimulating a second pole of the transmitter field, the segment section regions of which are disposed facing each other.

7. The steering angle sensor as set forth claim 1, wherein the transmitter element is disposed on a gear wheel that is coaxial to the steering column and that is driven by toothing disposed peripherally about the steering column.

8. The steering angle sensor as set forth in claim 7, comprising further toothing disposed peripherally about the steering column, wherein a torsion element is disposed axially between the two toothings.

9. A steering angle sensor for detecting a steering angle of a steering column over a range of angles greater than 360° in a vehicle, comprising:
- a transmitter element for stimulating a transmitter field and a measuring sensor for stimulating an output signal depending on reception of the transmitter field, wherein the measuring sensor and the transmitter element are disposed so that the transmitter field received by the measuring sensor is dependent on the angle of rotation of the steering column that is to be detected, and
- a counting element with a non-volatile memory for counting and outputting a number of revolutions of the transmitter field relative to a reference angle of rotation,
- wherein the transmitter element comprises a first semicircular segment disk for stimulating a first pole of the transmitter field and a second semicircular segment disk for stimulating a second pole of the transmitter field, the segment section regions of which are disposed facing each other.

10. A steering angle sensor for detecting a steering angle of a steering column over a range of angles greater than 360° in a vehicle, comprising:
- a transmitter element for stimulating a transmitter field and a measuring sensor for stimulating an output signal depending on reception of the transmitter field, wherein the measuring sensor and the transmitter element are disposed so that the transmitter field received by the measuring sensor is dependent on the angle of rotation of the steering column that is to be detected, and
- a counting element with a non-volatile memory for counting and outputting a number of revolutions of the transmitter field relative to a reference angle of rotation,
- wherein the transmitter element is disposed on a gear wheel that is coaxial to the steering column and that is driven by toothing disposed peripherally about the steering column, and
- further comprising toothing disposed peripherally about the steering column, wherein a torsion element is disposed axially between the two toothings.

* * * * *